A. S. CAMERON.
STEAM PUMPS.

No. 185,292. Patented Dec. 12, 1876.

Witnesses:

Inventor.
Adam S. Cameron
by
Van Santvoord & Hauff
his attys.

UNITED STATES PATENT OFFICE.

ADAM S. CAMERON, OF NEW YORK, N. Y.

IMPROVEMENT IN STEAM-PUMPS.

Specification forming part of Letters Patent No. 185,292, dated December 12, 1876; application filed October 24, 1876.

*To all whom it may concern:*

Be it known that I, ADAM S. CAMERON, of the city, county, and State of New York, have invented a new and useful Improvement in Direct-Action Steam-Pumps, which improvement is fully set forth in the following specification, reference being had to the accompanying drawing, in which—

Figure 1:
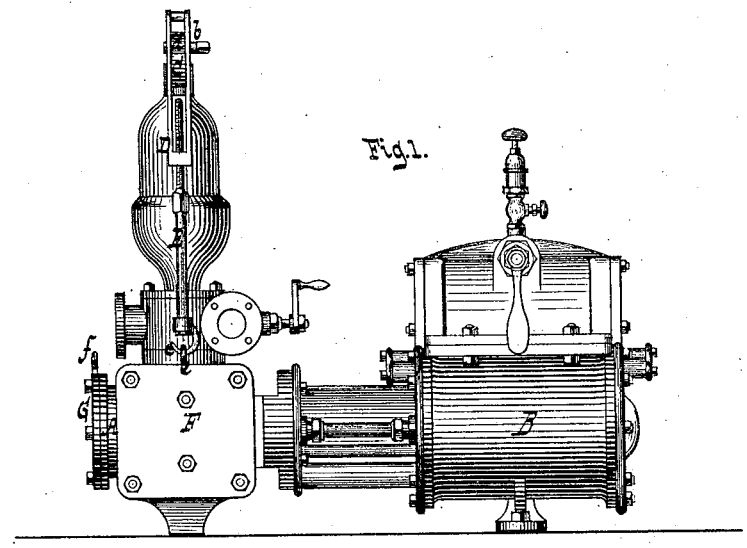
Figure 2:
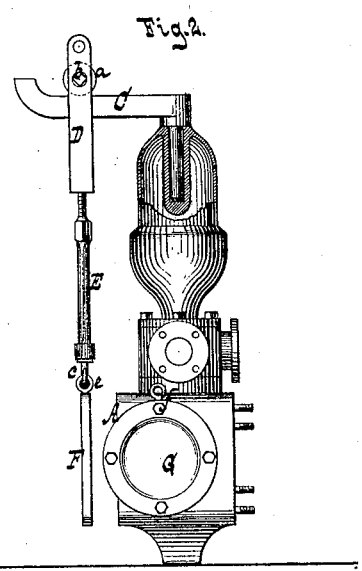

Figure 1 represents a side view. Fig. 2 is an end view, when the bonnet of the pump-valve chamber is removed.

Similar letters indicate corresponding parts.

In steam-pumps it happens frequently that the bonnet of the valve-chamber or the head of the pump-cylinder has to be taken off for the purpose of reseating or repairing the valves, or for renewing the packing of the pump-piston, or for other purpose of a similar nature. If the steam-pump is large, it requires several men to take off and replace said bonnet or head, and, besides this, the operation requires a long time on account of the great weight of the parts to be handled.

My invention consists of a swivel-arm, adapted to be mounted upon a steam-pump, to act in connection with a yoke and suitable mechanism for connecting with an eye in the bonnet of the valve-chamber, or in the head of the cylinder, so that when said bonnet or head is unscrewed it can be readily swung off from its seat and replaced with comparative ease, thus saving time and labor.

In the drawing, the letter A designates the pump-cylinder and the letter B the steam-cylinder of a direct-action steam-pump. With said pump-cylinder I have combined a swivel-arm, C, which supports a roller, $a$, from the axle $b$ of which is suspended a hook, $c$.

In the example shown in the drawing the arm C is firmly secured to a rod, which is stepped in a socket formed in the top of the air-chamber of the pump, and which turns in this socket. Said rod might, however, be cast into, or otherwise firmly secured to the air-chamber or to any other part of the pump, and in this case the arm C would be made to turn on the rod. A pipe might be substituted for this rod.

Such and other modifications may readily suggest themselves to any ordinary mechanic, but they would obviously be mere equivalents of the device which I have represented in the drawing.

From the axle of the roller $a$ is suspended a yoke, D, in the bottom end of which is secured a screw-rod, E, to which the hook $c$ is attached. By means of said screw-rod the hook can be raised or lowered to correspond to the position of eyes $e\,f$, which are secured, one in the bonnet F of the valve-chamber, and the other in the head G of the cylinder of the pump. The axle $b$ of the roller $a$ projects through the yoke D, and its end is made square, so that a winch or wrench of any suitable description can be applied to it. When the bonnet of the valve-chamber is to be taken off, the hook $c$ is made to engage with the eye $e$ on said bonnet. The screws which retain the bonnet in position are taken off and then the roller $a$ is turned outward toward the end of the swivel-arm C. By this operation the bonnet is moved off from its seat, and, by swinging the arm C round to the position shown in Fig. 2, free access is obtained to the interior of the valve-chamber. By reversing the motions above stated the bonnet can be replaced, and the whole operation can be performed by one man in a comparatively short time. The operation of removing the head of the pump-cylinder is the same.

By these means much time and labor are saved, particularly in large pumps where the bonnet and the cylinder-head are of such weight that it requires several men to handle the same if the operation of removing and replacing the same has to be performed without the aid of the mechanism which I have herein described.

It must be remarked that the operation of removing and replacing the bonnet or head can also be performed without the roller $a$, and in this case the hook would be suspended directly from the swivel-arm.

What I claim as new, and desire to secure by Letters Patent, is—

1. A swivel-arm adapted to be mounted upon a steam-pump by means of a connection such substantially as described, in combination with a yoke and mechanism for connecting it with the part or parts of the pump to be handled, in the manner essentially as herein shown and described.

2. The combination, with the pump-cylinder A and swivel-arm C, of a roller, $a$, from the axle of which is suspended a hook, $c$, to engage with eyes secured in the parts to be handled, substantially as set forth.

In testimony that I claim the foregoing I have hereunto set my hand this 12th day of October, 1876.

A. S. CAMERON.

Witnesses:
 W. HAUFF,
 E. F. KASTENHUBER.